(No Model.)
E. O. DANIELS.
DEVICE FOR REDUCING THE ENDS OF TUBES.
No. 365,053. Patented June 21, 1887.
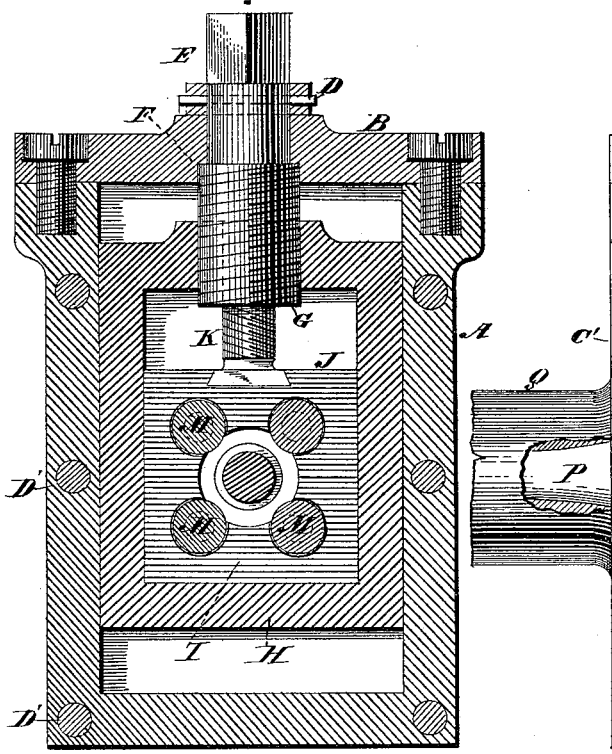
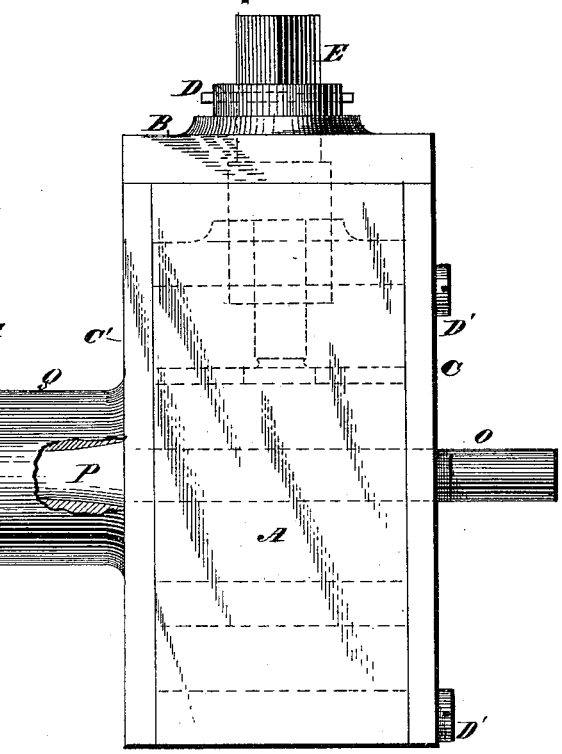
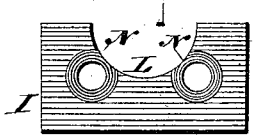
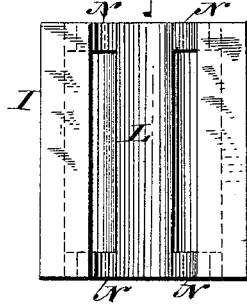
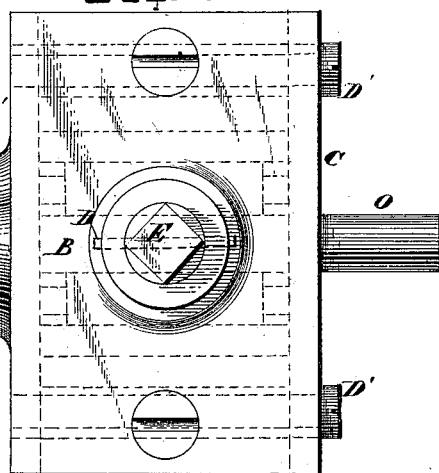
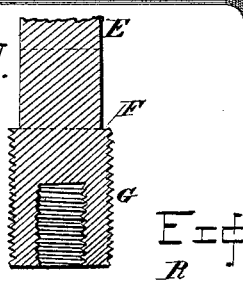
WITNESSES
INVENTOR
Eugene O. Daniels,
Toulmin & Jemmes.
his Attorneys.
N. PETERS, Photo-Lithographer, Washington, D. C.

UNITED STATES PATENT OFFICE.

EUGENE ORA DANIELS, OF SPRINGFIELD, OHIO.

DEVICE FOR REDUCING THE ENDS OF TUBES.

SPECIFICATION forming part of Letters Patent No. 365,053, dated June 21, 1887.

Application filed January 28, 1887. Serial No. 225,779. (No model.)

*To all whom it may concern:*

Be it known that I, EUGENE ORA DANIELS, a citizen of the United States, residing at Springfield, in the county of Clark and State of Ohio, have invented certain new and useful Improvements in Pipe-Reducing Tools, of which the following is a specification, reference being had therein to the accompanying drawings.
This invention relates to improvements in tools for compressing or reducing the size of metal pipes or tubes without removing any of the metal thereof, so as to form a tenon or male portion on them adapted to enter the end of a contiguous section of pipe or tubing.

The invention is designed with special reference to compressing copper pipe or tube ends in the manufacture of tubular lightning-rods, though it may be used with advantage in other arts.

The invention consists, essentially, of compressing or reducing rollers mounted in bearings which are capable of being forcibly moved toward each other, so that the rollers may act compressingly upon a pipe or tube, and of then being moved away from each other, to allow the pipe or tube to be readily withdrawn.

The invention further consists of a strong frame having a mandrel to support a pipe or tube, and carrying a right and left handed screw-threaded follower, and a sliding box provided with a fixed and a movable reducing or compressing block, each block having reducing rollers located in such manner that the pipes or tubes are compressed by them when the blocks are brought together, and yet are not flattened or indented, or otherwise distorted out of their original and generally regular contour.
In the accompanying drawings, forming a part of this specification, and on which like reference-letters indicate corresponding features, Figure 1 is a vertical sectional view of my improved tool; Fig. 2, a side elevation of the same; Fig. 3, a plan view thereof; Fig. 4, an end view of one of the blocks; Fig. 5, a plan view of the block; Fig. 6, a view of a pipe reduced at one end; Fig. 7, a sectional view of the follower, and Fig. 8 a section of a modified form of mandrel.

The letter A refers to a metallic box-like frame having a cross-head, B, preferably detachable, and having front and rear plates, C and C', secured by screws D'.

In an opening in the cross-head B is fitted the unthreaded portion of the follower E, a shoulder being provided at F to hold the follower against longitudinal upward movement, while a pin and shoulder, D, prevent it from dropping down. This follower has a shell-like portion, G, exteriorly and interiorly screw-threaded, the threads being in opposite directions, as right and left handed.

The letter H designates the sliding box, fitted to work smoothly up and down within the frame A and its front and rear plates, C and C', and having at one end a screw-threaded opening into which extends the threaded exterior of the follower, whereby the said box is reciprocated. Within this box H is firmly seated a compressing-block, I, and above it is slidingly fitted in the said box another compressing-block, J. This latter has a screw-threaded stem, K, suitably secured to it, and whose threads run oppositely to those of the exterior of the follower. The interior threads of the follower receive the stem K, and thus by revolving the follower, as by a wrench, the box H and the fixed compressing-block are moved in one direction and the sliding block in the other, so as to meet or recede from each other. The sliding block is guided vertically by the front and rear plates of the frame A. These blocks are recessed upon opposite faces, as seen at L, and are provided with compressing or reducing rollers M, preferably two in each block, and placed equidistantly apart and with their peripheries extending slightly within the recesses. These rollers are not quite so long as the blocks are deep, and are mounted in any convenient manner. The preferred manner is by boring the blocks through and through, (the bore opening into the recesses to allow the above-noted projection of the rollers into the recesses,) and fitting short bushings or rings N into the ends of the same to form bearings for the roller-journals. The face or front plate, C, has an opening therein opposite to the recesses when the blocks are together, to admit the pipes or tubes to be reduced, and extending from the rear plate, C', and concentrically between the peripheries of the reducing-rollers and through the said opening, is a mandrel, O, of the diameter to which it is desired to reduce the pipe or tube, and over which the same is slipped and thence projected into the tool and between the rollers. This mandrel is detachable, so as to substitute others of different sizes, and preferably has a tapering end, P, to enter a like tapering hole in the shank Q of the plate C'.

The invention is designed to be used in conjunction with a lathe having a turret, into which is extended and secured the said shank, and having a hollow head-stock spindle through which the pipe or tube is passed, and by which the same is revolved at a high speed a chuck, as usual, being carried by the head stock and employed to grasp the pipe or tube. While the pipe or tube is revolving, the compressing or reducing rollers are brought positively and forcibly upon it at the several points about its periphery, whereby it is compressed or reduced in diameter till it snugly fits the mandrel. When the blocks abut each other, the pipe or tube will be found to have been properly reduced, and then the rotation of the follower is reversed and the same operation repeated at each reduction or compression of a pipe or tube.

It is obvious that numerous detail changes may be made in the construction without in any sense departing from the essential idea of my invention—namely, the reducing-rollers so mounted as to be capable of being forcibly brought upon the pipe or tube. Again, a mandrel, while preferred, as I have ascertained by trial, is not absolutely essential, as when the pipe or tube is of the heavier grades, in respect to the thickness of the wall thereof, I can dispense with the use of the mandrel. Furthermore, the mandrel may be provided with a revoluble sleeve, R, as seen in Fig. 8, to prevent undue friction between the mandrel and the pipe or tube, and these sleeves are of various sizes, to suit the several sizes of pipes or tubes which are to be reduced.

Having thus fully described my invention, what I claim as new, and desire to secure by Letters Patent, is—

1. In a reducing-tool, the combination, with a frame and a follower, of a movable box carrying reducing-rollers, and a movable block carrying reducing-rollers, the follower being constructed to actuate the box in one direction and the movable block in the other direction, and a mandrel concentrically located with respect to the rollers.

2. In a reducing-tool, the combination, with a set of reducing-rollers and a block in which they are mounted, of other reducing-rollers and a block in which they are mounted, and a follower and intermediate devices connecting the follower with said blocks, whereby they are actuated to and from each other, and a mandrel located concentrically to the peripheries of said rollers when they are in a reducing position.

3. In a reducing-tool, the combination, with a frame and a rotating follower mounted therein and having right and left handed exterior and interior screw-threads, of a sliding box fitted within said frame and engaged by said follower, and the recessed block carried by it, and having reducing-rollers extending into said recess, a recessed movable block fitted within said box, having a threaded stem engaged by the follower and having reducing-rollers extended into said recess, and a mandrel located concentrically to the peripheries of the rollers when in a reducing position.

4. In a reducing-tool, the combination, with a frame having front and rear plates, a shank, and a mandrel extending from said rear plate, and a follower mounted therein and having a shell-like portion exteriorly and interiorly screw-threaded in opposite directions, of a box fitted slidingly within the frame and engaged by the said exterior screw-threads, and having a fixed recessed block carrying reducing-rollers which extend into said recess, and a recessed block slidingly mounted in said box, having reducing-rollers which extend into said recess, and having a threaded stem which enters the shell of the follower and is engaged by it.

5. In a reducing-tool, a block recessed longitudinally and bored out longitudinally, with the bores opening into said recess and having rings at the ends of the bores, and rollers fitted into said bores, extended into said recess, and journaled in said rings.

In testimony whereof I affix my signature in presence of two witnesses.

EUGENE ORA DANIELS.

Witnesses:
RANDOLPH COLEMAN,
E. S. WALLACE.